(12) United States Patent
Rash et al.

(10) Patent No.: US 9,202,056 B2
(45) Date of Patent: Dec. 1, 2015

(54) INTER-PROCESSOR ATTESTATION HARDWARE

(71) Applicant: Intel Corporation, Santa Clara, CA (US)

(72) Inventors: William C. Rash, Saratoga, CA (US); Martin G. Dixon, Portland, OR (US); Yazmin A. Santiago, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 13/839,048

(22) Filed: Mar. 15, 2013

(65) Prior Publication Data

US 2014/0283032 A1    Sep. 18, 2014

(51) Int. Cl.
*G06F 11/00*    (2006.01)
*G06F 21/57*    (2013.01)
*G06F 12/14*    (2006.01)
*G06F 7/04*     (2006.01)

(52) U.S. Cl.
CPC ..................................... *G06F 21/57* (2013.01)

(58) Field of Classification Search
CPC ....... G06F 21/57; G06F 21/64; G06F 21/575; G06F 21/572; H04L 9/3234; H04L 2209/127
See application file for complete search history.

(56) References Cited

U.S. PATENT DOCUMENTS

| | | | |
|---|---|---|---|
| 5,371,860 A * | 12/1994 | Mura et al. | 710/22 |
| 7,590,867 B2 * | 9/2009 | Scarlata et al. | 713/193 |
| 2005/0033987 A1 * | 2/2005 | Yan et al. | 713/201 |
| 2006/0236127 A1 * | 10/2006 | Kurien et al. | 713/193 |
| 2008/0059799 A1 * | 3/2008 | Scarlata | 713/176 |
| 2009/0049510 A1 * | 2/2009 | Zhang et al. | 726/1 |
| 2009/0154709 A1 * | 6/2009 | Ellison | 380/282 |
| 2010/0106479 A1 * | 4/2010 | Hieda | 703/26 |
| 2010/0161998 A1 * | 6/2010 | Chen et al. | 713/189 |
| 2011/0154501 A1 * | 6/2011 | Banginwar et al. | 726/26 |
| 2011/0202992 A1 * | 8/2011 | Xiao et al. | 726/10 |
| 2012/0331285 A1 * | 12/2012 | Bangerter et al. | 713/155 |
| 2013/0007889 A1 * | 1/2013 | McCloy | 726/26 |
| 2014/0006776 A1 * | 1/2014 | Scott-Nash et al. | 713/156 |

* cited by examiner

*Primary Examiner* — Dede Zecher
*Assistant Examiner* — Trang Doan
(74) *Attorney, Agent, or Firm* — Thomas R. Lane

(57) ABSTRACT

Embodiments of an invention for inter-processor attestation hardware are disclosed. In one embodiment, an apparatus includes first attestation hardware associated with a first portion of a system. The first attestation hardware is to attest to a second portion of the system that the first portion of the system is secure.

8 Claims, 3 Drawing Sheets

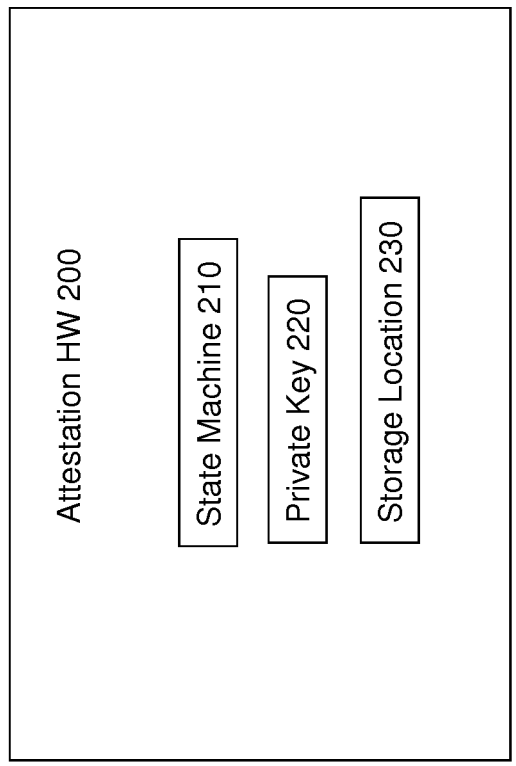

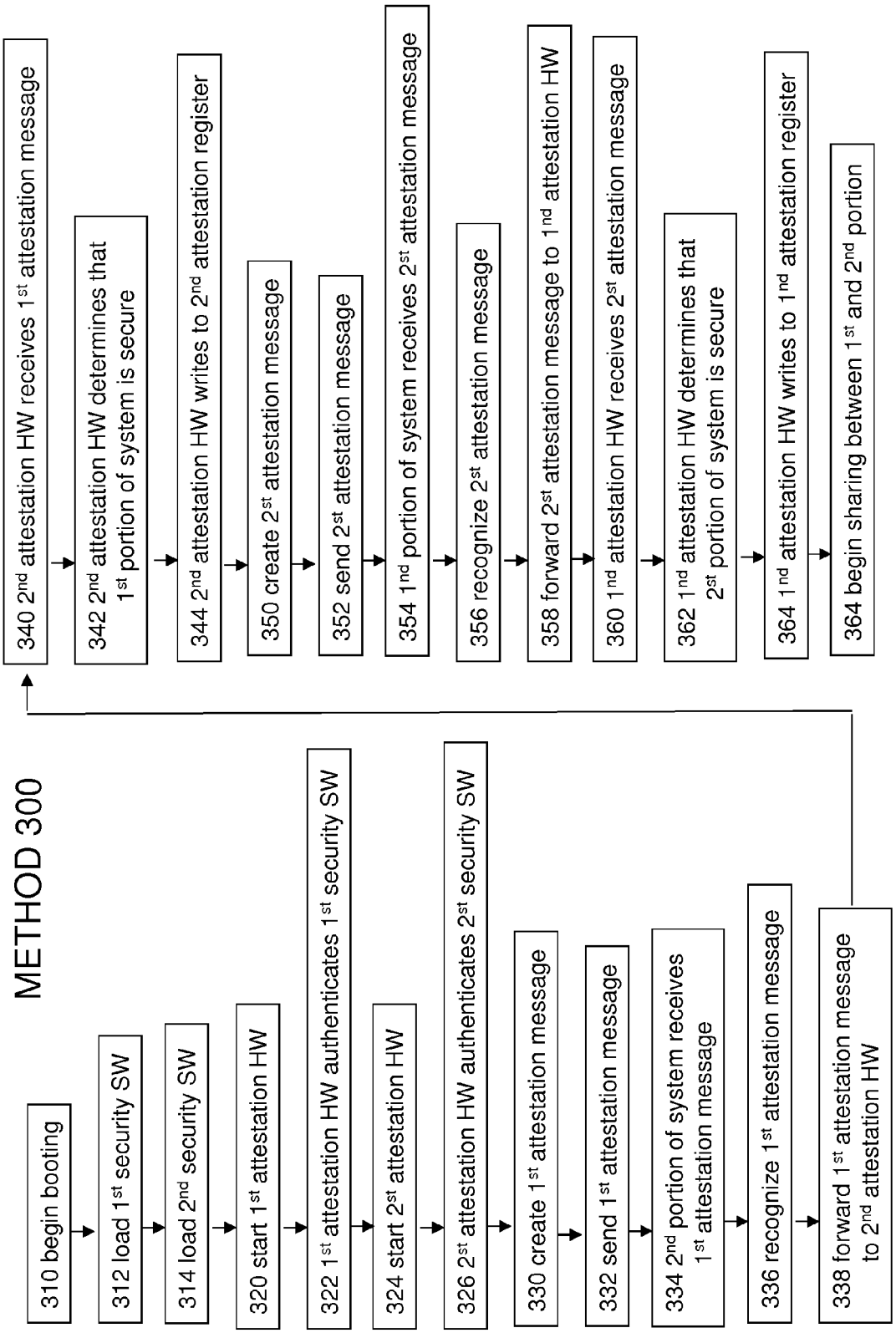

INTER-PROCESSOR ATTESTATION HARDWARE

BACKGROUND

1. Field

The present disclosure pertains to the field of information processing, and more particularly, to the field of security in information processing systems.

2. Description of Related Art

Malicious attacks are a serious threat to the security of information processing systems. Many techniques have been developed to defend against these attacks, but more are needed as information processing system development continues.

BRIEF DESCRIPTION OF THE FIGURES

The present invention is illustrated by way of example and not limitation in the accompanying figures.

FIG. 2 illustrates attestation hardware according to an embodiment of the present invention.

FIG. 3 illustrates a method for inter-processor attestation according to an embodiment of the present invention.

DETAILED DESCRIPTION

Figure 1:
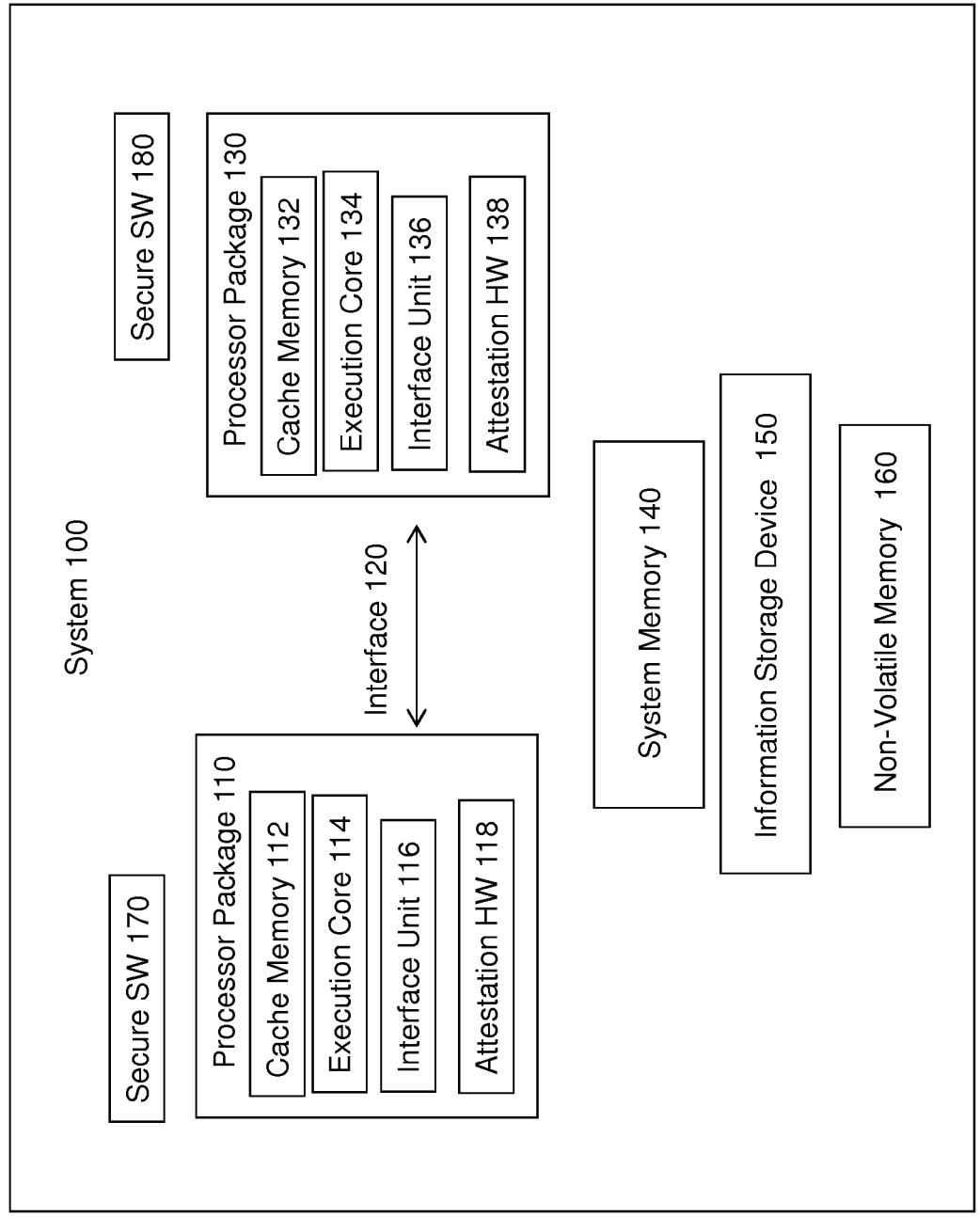
FIG. 1 illustrates a system including inter-processor attestation hardware according to an embodiment of the present invention.

Embodiments of an invention for inter-processor attestation hardware are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates system 100, an information processing system in which an embodiment of the present invention may be present and/or operate. System 100 may represent any type of information processing system, such as a server, a desktop computer, a portable computer, a set-top box, a hand-held device, or an embedded control system. System 100 includes processor package 110, inter-package interface 120, processor package 130, system memory 140, information storage device 150, and non-volatile memory 160. Processor package 110 and processor package 130 are coupled to each other through inter-package interface 120. Systems embodying the present invention may include any number of each of these components and any other components or other elements, such as information storage devices, peripherals, and input/output devices. Any or all of the other components or other elements in any system embodiment may be connected, coupled, or otherwise in communication with each other through any number of buses, point-to-point, or other wired or wireless interfaces or connections.

Processor package 110, processor package 130, and any other processor packages in embodiments may include one or more processors packaged within a single package, each of which may include multiple threads and/or multiple execution cores, in any combination. Each processor may be any type of processor, including a general purpose microprocessor, a special purpose processor, or a microcontroller. All processors may be the same type of processor or any combination of different types of processors may be used.

Processor package 110 includes cache memory 112, execution core 114, interface unit 116, and attestation hardware 118. Processor package 130 includes cache memory 132, execution core 134, interface unit 136, and attestation hardware 138. Each of processor package 110 and processor package 130 may also include any other circuitry, structures, or units not shown in FIG. 1.

Each of cache memory 112 and cache memory 132 may represent any one or more levels of cache memory in a memory hierarchy of system 100, implemented in static random access memory or any other memory technology. Each of cache memory 112 and cache memory 132 may include any combination of cache memories dedicated to or shared among any one or more execution cores or processors within processor package 110 according to any known approaches to caching in information processing systems.

Each of execution core 114 and execution core 134 may represent any one or more execution cores within any one or more processors as described above. Each of execution core 114 and execution core 134 may include any circuitry or other hardware, such as an arithmetic unit, logic unit, floating point unit, shifter, etc., for processing data and executing instructions. In one embodiment, each of execution core 114 and execution core 134 is hardwired to execute untranslated machine instructions (i.e., instructions that are not translated into micro-instructions or micro-operations using microcode or other control code stored in non-volatile memory within a processor) from cache memory 112 or cache memory 132 (respectively), system memory 140, or any other memory in system 100.

Each of interface unit 116 and interface unit 136 may include any circuitry or other hardware with which processor package 110 or processor package 130 (respectively) may communicate with each other and/or another processor package or packages in system 100.

Each of attestation hardware 118 and attestation hardware 138 may include any circuitry, state machine(s), or other hardware to execute one or more attestation protocols according to an embodiment of the present invention, for example, as illustrated in method 300 of FIG. 3. In one embodiment, attestation hardware 118 and/or attestation hardware 138 represents dedicated hardware that is not shared with any of the hardware of execution core 114 or execution core 134. Attestation hardware 118 and/or 138 may be power gated because it may be used infrequently and the need for its use may be predicted in advance.

FIG. 2 illustrates attestation hardware 200, embodiments of which may serve as attestation hardware 118 and attestation hardware 138 in system 100. Attestation hardware 200 may include state machine 210, private key 220, and attestation storage location 230.

State machine 210 may represent any one or more state machines to control the operation of attestation hardware 200 such that it may not be observed or interfered with. State machine 210 may use a random seed provided by a random number generator for state change. The random number generator may be within or external to attestation hardware 200. If external, the random seed may be provided through a secure datapath.

Private key 220 may represent a private key of a public/private key pair.

Attestation storage location 230 may represent a register or other type of storage to record, report, or otherwise store attestation information and may include any number of bits or fields arranged according to any format. Attestation storage location 230 (or any portion of storage location 230) may be writable only by the attestation hardware in which it is contained and readable by that attestation hardware and processors and other agents in its own processor package, and in some embodiments, readable by processors and other agents outside of its own processor package.

Returning to FIG. 1, inter-package interface 120 may represent any interface between processor package 110 and processor package 130, such as a point-to-point link in an interconnect fabric according to any system interconnect architecture, a shared pathway according to any bus architecture, or any other interface according to any communication architecture. Data, control information, and/or or other information may be transmitted or otherwise sent between processor package 110 and processor package 130 through inter-package interface 120 in packets, messages, or any other means according to the protocol of any such interconnection or communication architecture.

System memory 140 may include dynamic random access memory and/or any other type of medium accessible by processors in processor packages 110 and/or 130, and may be used to store data and/or instructions used or generated by any such processors and/or other components. Information storage device 150 may represent any type of non-volatile information storage device, such as flash memory or a hard disk drive. Non-volatile memory 160 may represent any type of non-volatile memory, such as read-only or flash memory, to store bootstrap or other code to be used to boot, start, or otherwise initialize system 100. Non-volatile memory 160 may be included within and/or distributed among any component or components of system 100.

FIG. 1 also illustrates software modules 170 and 180, each of which may be anti-malware or any other security code to protect the operation of system 100, any portion of system 100, data generated by, and/or data stored in system 100, from any form of corruption, unauthorized use, or other attack. As such, software module 170 and/or 180 may have access to system 100, portions of system 100, and/or portions of the system memory of system 100 that is not monitored, managed, or controlled by an operating system, hypervisor, virtual machine monitor, or other system software. Therefore, it may be desirable to determine that software modules 170 and/or 180 have not been modified and/or measure or verify the authenticity of software modules 170 and/or 180 according to embodiments of the present invention. Furthermore, it may be desirable for processor package 110 (or a processor in processor package 110) to prove or attest to processor package 130 (or a processor in processor package 130 or any other processor in system 100), according to embodiments of the present invention, that it is protected by security software such as software module 170, or that its operation is otherwise secure, and vice versa (i.e., processor package 130 to attest to processor package 110 that it is protected by software module 180). Therefore, embodiments of the present invention may provide for each processor, processor package, and/or other processing unit or island to attest to the security of its own operation to the other processors, processor packages, and/or other processing units or islands in system 100 such that data and/or program execution may be shared.

FIG. 3 illustrates method 300 for inter-processor attestation according to an embodiment of the present invention. Although method embodiments of the invention are not limited in this respect, reference may be made to elements of FIGS. 1 and 2 to help describe the method embodiment of FIG. 3.

In box 310, the powering up, booting, resetting, or other initialization of an information processing system such as system 100 begins. In box 312, software module 170 is loaded into or stored in system memory 140, for example, from information storage device 150. In other embodiments, software module 170 may be loaded into or stored in another memory within system 100, such as a non-volatile memory, before or during the boot process. Software module 170 may be loaded or stored to a first location or address in the system memory map of system 100 to which attestation hardware 118 may be directed, through hardware, firmware, or software, for measurement (as described below) or other verification of software module 170. In box 314, software module 180 is loaded into or stored in system memory 140, for example, from information storage device 150. In other embodiments, software module 180 may be loaded into or stored in another memory within system 100, such as a non-volatile memory, before or during the boot process. Software module 180 may be loaded or stored to a second location or address in the system memory map of system 100 to which attestation hardware 118 may be directed, through hardware, firmware, or software, for authentication, measurement, or other verification (as described below) of software module 170.

In box 320, the operation of attestation hardware 118 begins. Attestation hardware 118 may be hardwired to begin operation during the boot sequence or may be started by an instruction in boot code running on any processor or other agent in system 100; however, once started, attestation hardware 118 operates independently from the execution of instructions by any processor or other agent and its operation cannot be observed.

In box 322, attestation hardware 118 authenticates, measures, or otherwise verifies software module 170 and/or the firmware or hardware of processor package 110. Box 322 may include calculating, generating, or deriving a measurement, which may be a cryptographic hash or other value based on the content, amount of memory, relative location of each page, and/or any other attributes of software module 170 or any attributes of the firmware or hardware of processor package 110. The measurement may be based on code or other information within the module and/or a public key or other information used to sign or otherwise attest to the identity or integrity of the module, the firmware, and/or the hardware. The measurement may be used to derive one or more of a checksum, digital signature, cryptographic key, or other data to verify or attest to the identity and/or authenticity of software module 170 and/or processor package 110. The measurement and/or other data derived from the measurement may be compared to or otherwise used in connection with a digital signature, certificate, or other data, for example, provided by a software vendor or system manufacturer and stored with or otherwise associated with software module 170 or processor package 110, to verify that software module 170 is authentic and/or unmodified and/or to otherwise verify the integrity and security of processor package 110. In one embodiment, attestation hardware 118 may authenticate or otherwise verify the integrity of software module 170, and then software module 170 may be executed to authenticate or otherwise verify the integrity of processor package 110. In one embodiment, software module 170 may interact with attestation hardware 118 to perform one or more portions of method 300.

In box 324, the operation of attestation hardware 138 begins. Attestation hardware 138 may be hardwired to begin operation during the boot sequence or may be started by an instruction in boot code running on any processor or other agent in system 100; however, once started, attestation hardware 138 operates independently from the execution of instructions by any processor or other agent and its operation cannot be observed.

In box 326, attestation hardware 138 authenticates, measures, or otherwise verifies software module 180 and/or the firmware or hardware of processor package 130. Box 326 may include calculating, generating, or deriving a measurement, which may be a cryptographic hash or other value based on the content, amount of memory, relative location of each page, and/or any other attributes of software module 180 or any attributes of the firmware or hardware of processor package 130. The measurement may be based on code or other information within the module and/or a public key or other information used to sign or otherwise attest to the identity or integrity of the module, the firmware, and/or the hardware. The measurement may be used to derive one or more of a checksum, digital signature, cryptographic key, or other data to verify or attest to the identity and/or authenticity of software module 180 and/or processor package 130. The measurement and/or other data derived from the measurement may be compared to or otherwise used in connection with a digital signature, certificate, or other data, for example, provided by a software vendor or system manufacturer and stored with or otherwise associated with software module 180 or processor package 130, to verify that software module 180 is authentic and/or unmodified and/or to otherwise verify the integrity and security of processor package 130. In one embodiment, attestation hardware 138 may authenticate or otherwise verify the integrity of software module 180, and then software module 180 may be executed to authenticate or otherwise verify the integrity of processor package 130. In one embodiment, software module 180 may interact with attestation hardware 138 to perform one or more portions of method 300.

In box 330, attestation hardware 118 creates a first message, token, or other communication to attest that processor package 110 is secure, its identity is authentic, that it is protected by security software such as software module 170, and/or to provide any other form of attestation. The message may be a special message that may only be created by attestation hardware 118 or another instance of attestation or security hardware, for example, by including the setting of one or more bits or signals that may only be set by security hardware, and that may therefore be confirmed to be genuine or valid, and/or by encrypting the message using a private key such as private key 220 such that the message may only be interpreted by another instance of attestation hardware using the private/public key pair. The message may include enough bits such that randomly changing them or looking for patterns does not reveal the encryption key and/or to include a random number such that different instances of the same message may look different. In various embodiments, messages may have different content or format to indicate particular attestation information such as type or extent of attestation.

In box 332, the first message may be sent or otherwise transmitted by interface unit 116, from processor package 110 to interface 120. In box 334, interface unit 136 of processor package 130 receives the first message. In box 336, interface unit 136 recognizes, for example based on the setting of one or more bits or signals that may only be set by security hardware, that the first message is an attestation message. In box 338, interface unit 136 forwards the first message to attestation hardware 138.

In box 340, attestation hardware 138 receives the first message. In box 342, attestation hardware 138 uses the first message to determine that that processor package 110 is secure. In box 344, attestation hardware 138 reports to processor package 130 that processor package 110 is secure. For example, attestation hardware 138 may write a first field of an attestation storage location such as attestation storage location 230 to identify processor package 110 as or indicate that processor package 110 is secure.

In box 350, attestation hardware 138 creates a second message, token, or other communication to attest that processor package 130 is secure, its identity is authentic, that it is protected by security software such as software module 180, and/or to provide any other form of attestation. The message may be a special message that may only be created by attestation hardware 138 or another instance of attestation or security hardware, for example, by including the setting of one or more bits or signals that may only be set by security hardware, and that may therefore be confirmed to be genuine or valid, and/or by encrypting the message using a private key such as private key 220 such that the message may only be interpreted by another instance of attestation hardware using the private/public key pair. The message may include enough bits such that randomly changing them or looking for patterns does not reveal the encryption key and/or to include a random number such that different instances of the same message may look different. In various embodiments, messages may have different content or format to indicate particular attestation information such as type or extent of attestation.

In box 352, the second message may be sent or otherwise transmitted by interface unit 136, from processor package 130 to interface 120. In box 354, interface unit 116 of processor package 110 receives the second message. In box 356, interface unit 116 recognizes, for example based on the setting of one or more bits or signals that may only be set by security hardware, that the second message is an attestation message. In box 358, interface unit 116 forwards the second message to attestation hardware 118.

In box 360, attestation hardware 118 receives the second message. In box 362, attestation hardware 118 uses the second message to determine that that processor package 130 is secure. In box 364, attestation hardware 118 reports to processor package 110 that processor package 130 is secure. For example, attestation hardware 118 may write a second field of an attestation storage location such as attestation storage location 230 to identify processor package 130 as or indicate that processor package 130 is secure.

In box 370, processor package 110 and processor package 130 may begin to share data and/or program execution.

In various embodiments of the present invention, the method illustrated in FIG. 3 may be performed in a different order, with illustrated boxes combined or omitted, with additional boxes added, or with a combination of reordered, combined, omitted, or additional boxes. Furthermore, various other embodiments of the present invention are possible, aspects of some of which are described below.

Embodiments of the present invention may include embodiments in which attestation hardware is associated, instead of with a processor package, with a single processor, a single execution core, a single agent (where an agent may include any element, component, or group of elements or components that may communicate with any other element, component, or group of elements or components), any number of processors, any number of execution cores, any number of agents, or any combination of any of such items within or among one or more dice and/or packages (where each such item or group of items with which an instance of attestation hardware is associated may be referred to as an "island"). In such embodiments, attestation hardware associated with a first island may attest to attestation hardware associated with any other island that the first island is secure. The use of attestation hardware provides for attestation to occur independently from the execution of software, firmware, or other instructions by a processor, execution core, or agent within an island, so that the attestation protocol cannot be observed, manipulated, influenced, controlled, corrupted, attacked, or otherwise interfered with.

Embodiments of the present invention may include embodiments in which attestation hardware is associated with a processor, execution core, or other agent which may operate without microcode or a control store, and/or with a processor, execution core, or other agent having an instruction set architecture according to a reduced instruction set computing approach.

Embodiments of the present invention may include embodiments in which the operation of an instance of attestation hardware is started or triggered by an event instead of or in addition to the boot process. For example, in one embodiment, a first instance of attestation hardware associated with a first island may send a message to a second instance of attestation hardware associated with a second island to trigger the operation of the second instance of attestation hardware to attest to the security of the second island to the first island. In another embodiment, attestation hardware may be started by an instruction in code running on a processor or other agent; however, once started, the attestation hardware operates independently from the execution of instructions by any processor or other agent and its operation cannot be observed. In another embodiment, the addition of or modification to the hardware, firmware, or software in a system may trigger the operation of attestation hardware.

Embodiments of the present invention may include embodiments in which attestation hardware monitors the execution of software by a processor, execution core, or other agent in the island with which the attestation hardware is associated. For example, in one embodiment, attestation hardware may re-authenticate, re-measure, or re-verify software periodically or from time to time in order to ensure that the software has not been modified or corrupted, and may attest to such re-authentication, re-measurement, or re-verification to one or more other islands periodically or from time to time. Each such re-authentication, re-measurement, or re-verification may use program address, data read from instructions, data read from protected memory, and/or any other information to prove that the island is still operating correctly. Each such attestation or re-attestation may include sending security messages or other messages between islands, where such messages may only be created or generated by attestation hardware, and/or may be sent between islands without modification by other hardware, firmware, or software. Separate signatures may be used for initialization and subsequent operation.

Aspects of the present invention may be embodied in data stored on a machine-readable medium, where the data represents a design or other information usable to fabricate all or part of attestation hardware 118 and/or 138.

Thus, embodiments of an invention for inter-processor attestation hardware have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising: an execution core to execute instructions; and first attestation hardware, wherein the first attestation hardware is unshared with the execution core, the first attestation hardware including
    a state machine to control the first attestation hardware to calculate a first measurement of a first security software module associated with the first processor, compare the first measurement to a second measurement to verify integrity of the first security software module, and send a first attestation message to second attestation hardware in another processor, wherein operation of the state machine, after being started, is independent from the processor's execution of instructions, and wherein the first attestation message is creatable only by the first attestation hardware;
    a private key configured to encrypt the first attestation message such that the first attestation message can be decrypted only by attestation hardware; and
    a storage location, writable only by the first attestation hardware, in which to store an indication that the first attestation hardware has received a second attestation message from the second attestation hardware, the second attestation message to indicate that the second attestation hardware has verified integrity of a second security software module associated with the second processor.

2. The processor of claim 1, wherein the processor is to execute untranslated machine instructions.

3. The processor of claim 1, wherein the processor operates without microcode.

4. The processor of claim 1, wherein the processor is a reduced instruction set computing processor.

5. A method comprising:
    calculating, by first attestation hardware associated with a first processor, a measurement of a first security software module associated with the first processor, the first processor including an execution core to execute instructions;
    comparing, by the first attestation hardware, the first measurement to a second measurement to verify integrity of the first security software module;
    encrypting, using a private key in the first attestation hardware, a first attestation message such that the first attestation message can be decrypted only by attestation hardware, wherein the first attestation message is creatable only by the first attestation hardware;

sending, by the first attestation hardware to second attestation hardware in a second processor, the first attestation message;

receiving, by the first attestation hardware, a second attestation message to indicate that the second attestation hardware has verified integrity of a second security software module associated with the second processor; and storing, by the first attestation hardware into a storage location writable only by the first attestation hardware, an indication that the first attestation hardware has received the second attestation message;

wherein operation of the first attestation hardware is controlled by a state machine that after being started is independent from the first processor's execution of instructions: and wherein the first attestation hardware is unshared with the execution core.

6. The method of claim 5, further comprising sharing, in response to receiving the second attestation message, data between the first processor and the second processor.

7. The method of claim 5, further comprising sharing, in response to receiving the second attestation message, program execution between the first processor and the second processor.

8. A system comprising:
a first processor and a second processor;
a first security software module associated with the first processor; a second security software module associated with the second processor; the first processor including
a first execution core to execute instructions, and
first attestation hardware, wherein the first attestation hardware is unshared with the first execution core, the first attestation hardware including
a first state machine to control the first attestation hardware to calculate a first measurement of the first security software module, compare the first measurement to a second measurement to verify integrity of the first security software module, and send a first attestation message to second attestation hardware in the second processor, wherein operation of the first state machine, after being started, is independent from the first processor's execution of instructions, and wherein the first attestation message is creatable only by the first attestation hardware;

a first private key configured to encrypt the first attestation message such that the first attestation message can be decrypted only by attestation hardware; and a first storage location, writable only by the first attestation hardware, in which to store a first indication that the first attestation hardware has received a second attestation message from the second attestation hardware, the second attestation message to indicate that the second attestation hardware has verified integrity of the second security software module;

the second processor including
a second execution core to execute instructions, and
second attestation hardware, wherein the second attestation hardware is unshared with the second execution core, the second attestation hardware including
a second state machine to control the second attestation hardware to calculate a third measurement of the second security software module, compare the third measurement to a fourth measurement to verify integrity of the second security software module, and send the second attestation message to the first attestation hardware, wherein operation of the second state machine, after being started, is independent from the second processor's execution of instructions, and wherein the second attestation message is creatable only by the second attestation hardware;

a second private key configured to encrypt the second attestation message such that the second attestation message can be decrypted only by attestation hardware; and a second storage location, writable only by the second attestation hardware, in which to store a second indication that the second attestation hardware has received the first attestation message.

* * * * *